(12) United States Patent
O'Brien

(10) Patent No.: US 10,994,984 B2
(45) Date of Patent: May 4, 2021

(54) LEVEL SENSING APPARATUS

(71) Applicant: Packaging Innovation Limited, London (GB)

(72) Inventor: Michael Gerard O'Brien, London (GB)

(73) Assignee: PACKAGING INNOVATION LTD., London (GB)

(*) Notice: Subject to any disclaimer, the term of this patent is extended or adjusted under 35 U.S.C. 154(b) by 42 days.

(21) Appl. No.: 16/448,779

(22) Filed: Jun. 21, 2019

(65) Prior Publication Data

US 2019/0389716 A1    Dec. 26, 2019

(30) Foreign Application Priority Data

Jun. 25, 2018 (GB) .................................. 1810402

(51) Int. Cl.
*B65D 51/18* (2006.01)
*B65D 47/14* (2006.01)
(Continued)

(52) U.S. Cl.
CPC ......... *B67D 3/0093* (2013.01); *B65D 47/142* (2013.01); *B65D 51/18* (2013.01);
(Continued)

(58) Field of Classification Search
CPC .. B67D 3/0093; B67D 3/0064; B67D 7/0205; B67D 7/0288; B65D 47/142;
(Continued)

(56) References Cited

U.S. PATENT DOCUMENTS

2005/0120792 A1* 6/2005 Merrild .................. G01F 23/14
73/303

FOREIGN PATENT DOCUMENTS

CN       202928655 U     5/2013
DE   202010004532 U1     7/2010
(Continued)

OTHER PUBLICATIONS

Search Report under Section 17(5) for United Kingdom Patent Application No. GB1810402.6 dated Nov. 14, 2018 (4 pages).

*Primary Examiner* — Jason K Niesz
(74) *Attorney, Agent, or Firm* — Withrow & Terranova, P.L.L.C.

(57) ABSTRACT

An apparatus for dispensing liquid from a container, and for monitoring the level of liquid within said container, comprises a container for storing liquid to be dispensed; and a conduit, the conduit comprising: a feed tube extending from the container to an appliance; a dip tube extending in the container to the bottom of the container; a liquid supply channel extending through the feed tube and dip tube and having an open first end defined by a lower end of the dip tube, which, in use, is arranged to be immersed in said liquid in said container, and a second end arranged, in use, to extend outside of said container; and a pressure measurement channel branching from the feed tube at a point located between said first and second ends of the liquid supply channel. The apparatus further comprises a pressure transducer in fluid communication with said pressure measurement channel, and a means to draw liquid from the first end of the liquid supply channel to dispense liquid from the second end of the liquid supply channel. The pressure measurement channel branches from the feed tube at a fixed height relative to the bottom of the dip tube.

14 Claims, 13 Drawing Sheets

(51) Int. Cl.
  *B67D 3/00* (2006.01)
  *B65D 51/16* (2006.01)
(52) U.S. Cl.
  CPC ............ *B67D 3/0064* (2013.01); *B65D 51/16* (2013.01); *B65D 2251/1016* (2013.01)
(58) Field of Classification Search
  CPC .............................. B65D 51/18; B65D 51/16; B65D 2251/1016; B65D 47/32; B65D 51/1644; B65D 85/84; B65D 11/08; B65D 47/02; B65D 49/08; Y02W 30/80; G01F 23/18; G01F 23/14
  See application file for complete search history.

(56) References Cited

FOREIGN PATENT DOCUMENTS

| | | | |
|---|---:|---|---|
| GB | 291128 | A | 5/1928 |
| JP | S60166824 | A | 8/1985 |
| WO | 03095953 | A1 | 11/2003 |
| WO | 2013168065 | A1 | 11/2013 |

\* cited by examiner

LEVEL SENSING APPARATUS

CROSS-REFERENCE TO RELATED APPLICATIONS

This application claims priority to United Kingdom Patent Application No. 1810402.6 filed on Jun. 25, 2018, wherein the contents of the foregoing application is hereby incorporated by reference in its entirety.

TECHNICAL FIELD

The present invention relates to an apparatus for dispensing liquid from a container and for monitoring the level of liquid within said container, and in particular, but not exclusively, to an apparatus suitable for dispensing and measuring the level of corrosive or otherwise hazardous chemical solutions. The invention also relates to a method of determining the level of a liquid within a container, and in particular, but not exclusively, to a method suitable for use with corrosive or otherwise hazardous solutions.

BACKGROUND

The supply of liquids for industrial and/or commercial applications, such as concentrated chemical cleaning systems, requires the liquid to be stored in appropriate containers for distribution from the supplier to the user. Reusability of such containers is becoming an increasingly pressing issue, as the supplier (or whoever is responsible for placing the container into the market) is responsible for the entire lifecycle of the container. Thus, it is desirable for the supplier to retrieve empty containers from the user, such that the container can be refilled (preferably with the same liquid) and redistributed. This reduces the number of used containers being sent to landfill or being recycled.

A "closed loop" distribution system is therefore beneficial, in which the supplier distributes a container filled with a particular liquid to the user, and once the container has been emptied, the container is returned to, or retrieved by, the supplier and replaced with a filled or refilled container. The original container can then be refilled with the same liquid by the supplier and redistributed to the same or another user. The container may be sealed when outside of the supplier's control, such that the user is able to dispense liquid from the container but is unable to refill the container. Potential contamination of the container with other liquids is thereby prevented, and the container can be refilled with the same liquid by the supplier for redistribution without the need to wash or decontaminate the container. In such a system, containers can be reused a large number of times, thus minimising the number of empty containers being sent to landfill or recycled.

In such systems, it is desirable that the level of liquid within a container is monitored throughout its use, by the user and also by the supplier. Accordingly, a replacement container can be distributed to the user before the original container is empty, avoiding any possible downtime which may result from the unavailability of the appropriate liquid.

Accordingly, a means is required for accurately and reliably measuring the level of liquid in a container. In particular, a means is required which can provide a level measurement reading as an electrical signal, rather than a simple visual gauge, allowing the user and/or supplier to be alerted when the level of liquid in the container is low. For example, such means could be employed in a wider automated distribution system, which receives an alert of a low level in a particular container and automatically places an order for and/or distributes a replacement container (or containers) to the user of that particular container.

A number of types of means for the measurement of the level of liquid in a container are known. For example, float-based level measurement apparatuses utilise the buoyancy of a float on the surface of a liquid in a container, in combination with a sensing probe within the container arranged to detect the vertical position of the float, and to convert this into a level of the liquid within the container. The float may be optically or magnetically detected, for example. Alternatively, a capacitive level measurement means may be provided, which measures the capacitance between two probes, either within the container or positioned outside of the container. An advantage of the latter arrangement is that it may avoid the requirement for components to be mounted within the container, in contact with the liquid, which may be hostile to many types of components.

Similarly, ultrasonic level measurement means are known to calculate the level of liquid. These use the time of flight of an ultrasonic pulse signal, which has been reflected from the surface of the liquid within the container.

Optical level measurement can also be arranged to measure the level of liquid within a container by use of a light source or sources positioned on the exterior of the container.

However, all of these level measurement apparatuses have deficiencies. Many require components to be positioned within the container. Where such components are electrical or metallic components, for example, the apparatus becomes unsuitable for certain types of liquid, such as caustic cleaning solutions, which may degrade the components. Furthermore, the components must either be installed into the container by the user upon receipt of the container, which greatly complicates the process of replacing a container and prevents a "closed loop" distribution system from being employed, or alternatively each container must be supplied with the appropriate components already installed, which increases the cost of each container and in the event of components failing, these must either be repaired or the container discarded.

Apparatuses utilising components applied to the exterior of the container, such as some capacitive or optical apparatuses, again increase the burden on the user when replacing a container, and also require accurate positioning of the components and the container in order to obtain a reliable level measurements. Thus, measurement of the level of liquid using such apparatuses is prone to error.

An alternative solution is to employ a system in which the volume of liquid dispensed from the container during each dispensing operation is measured, and which is programmed to determine the remaining level of liquid within the container based on the known volume which has been extracted from the container. However, this requires the user to reset the system each time a container is replaced, and thus is prone to error.

The present invention arose in an attempt to provide an improved apparatus for dispensing liquid from a container, and for monitoring the level of liquid within said container, which overcomes the deficiencies of known level measurement apparatuses described above.

SUMMARY

According to the present invention there is provided an apparatus for dispensing liquid from a container and for monitoring the level of liquid within said container, the apparatus comprising a container for storing liquid to be dispensed; and a conduit, which itself comprises: a feed tube extending from the container to an appliance; a dip tube extending in the container to the bottom of the container; a liquid supply channel extending through the feed tube and dip tube and having an open first end defined by a lower end of the dip tube, which, in use, is arranged to be immersed in said liquid in said container, and a second end arranged, in use, to extend outside of said container; and a pressure measurement channel branching from the liquid supply channel at a point located between said first and second ends of the liquid supply channel.

The apparatus further comprises a cap arranged to engage with a neck of the container, the cap comprising a first portion to which the dip tube is connected, which first portion is arranged to engage with the neck of the container such that the first portion to which the dip tube is connected can be pre-installed into the neck of the container, allowing the container to be supplied with the dip tube in place, the cap further comprising a second portion to which the feed tube is connected, which second portion is arranged to releasably engage with the first portion, so as to fluidly couple the dip tube to the feed tube to form the liquid supply channel of the conduit, permitting, in use, the container to be replaced by disconnecting the second portion from the first portion of the cap, and subsequently connecting the same second portion to a different first portion, pre-installed into the neck of a replacement container.

The apparatus further comprises a pressure transducer in fluid communication with the pressure measurement channel, and a means to draw liquid through the liquid supply channel from the first end of the liquid supply channel to the second end of the liquid supply channel so as to dispense liquid from said second end. In the apparatus of the present invention, the pressure measurement channel branches from the liquid supply channel at a fixed height relative to the second portion of the cap, and thus at a fixed height relative to the bottom of the dip tube, when the second portion of the cap is engaged with the first portion of the cap.

With the present invention, liquid stored within a container can be dispensed through the liquid supply channel of the conduit. A subsequent measurement of the pressure within the pressure measurement channel, after termination of the dispensing, allows the level of liquid within the container to be determined. An advantage of the present invention is that both operations, namely dispensing and liquid level measurement, can be carried out using a single conduit extending into the container. Thus, it is not necessary to insert additional components into the container in order to measure the level of liquid in the container. This is particularly advantageous for containers containing corrosive or otherwise hazardous chemical solutions, such as caustic cleaning solutions, which may cause damage to any such components.

A further advantage of the present invention is that it requires only a single point of connection to the container, being the liquid supply channel of the conduit, which is arranged to extend into the container and to be immersed in the liquid. Accordingly, where the apparatus is installed in a system which requires regular dispensing of a liquid from a container, such as dispensing of a cleaning solution into an industrial dishwasher system, for example, replacement of the container by the user is greatly simplified.

The cap provides a convenient means for connecting the conduit to the container, whilst reliably positioning the pressure measurement channel at the appropriate fixed height relative to the container and the liquid contained therein. Furthermore, the container may be a standard container having an appropriate cap fitting, eliminating the need for a bespoke container.

The term "cap" as used in the context of the present specification, including the appended claims, encompasses any lid, cover, bung or other appropriate means for engaging with a neck of a container.

The first and second portions of the cap are releasably interconnecting portions, such that the first portion to which the dip tube is connected can be pre-installed into the neck of the container, and thus the container can be supplied with the dip tube in place. The second portion to which the feed tube is connected can subsequently be connected to the first portion, so as to fluidly connect the dip tube to the feed tube through the liquid flow passage so as to form the liquid supply channel of the conduit. That is to say, the liquid supply channel is formed by connection of the dip tube and the feed tube to respective portions of the liquid flow passage.

According to the arrangement of the present invention, a supplier can distribute to a user a container having a first portion of the cap and the dip tube pre-installed. Upon receipt of the container, the user can simply engage the second portion of the cap with the first portion of the cap to fluidly couple the feed tube to the dip tube. Setup of the apparatus by the user is thereby a simple process. Similarly, when it is required to replace a container, the second portion can be readily disengaged from the first portion, allowing a replacement container to be installed and the original container to be returned to the supplier avoiding the need for user to withdraw a dip tube contaminated with the liquid to be dispensed. The replacement container is installed by connecting the same second portion of the cap to a different first portion, which is installed into the neck of a replacement container.

With the apparatus of the present invention, the pressure within the pressure measurement channel of the apparatus, which can be measured by the pressure transducer, is proportional to the height of a column of liquid within the conduit which extends from the pressure measurement channel to the level of liquid within the container. Specifically, gravity acting on said column of liquid exerts a negative pressure (relative to atmospheric pressure) on the pressure transducer, the negative pressure being proportional to the height of the column of liquid. Thus, with the fixed height of the pressure measurement channel, relative to the lower end of the dip tube, the apparatus can be calibrated to determine the level of liquid with the container based on the measured pressure within the pressure measurement channel.

The term "pressure" as used in the context of the present specification, including the appended claims, encompasses both negative and positive pressures relative to atmospheric pressure.

Advantageously, the pressure measurement channel branches from the liquid supply channel at a fixed height relative to the lower end of the dip tube. Accordingly, the user or manufacturer can reliably install the apparatus onto a container, with the pressure measurement channel being positioned at a constant fixed height relative to the top of the container for every container to which the apparatus is connected. This prevents the height of the pressure measurement channel, relative to the lower end of the dip tube, from changing each time the container is replaced, and allows pressure measurements to be consistently and reliably carried out with multiple containers. The apparatus can thereby be calibrated for a container of a particular type in a first instance and can thereafter be used for reliable determination of the level of liquid in all containers of the same type on which the apparatus is installed. The apparatus may also be calibrated for multiple types of container, thus allowing the apparatus to be used to measure the level of liquid in multiple types of container.

The pressure measurement channel may preferably be arranged to branch from the liquid supply channel, substantially at right angles to the liquid supply channel. Accordingly, any liquid which may be drawn into the pressure measurement channel after operation of the means to draw liquid through the liquid supply channel is drawn in a substantially horizontal direction. This avoids liquid drawn into the pressure measurement channel effectively adding or counterbalancing the column of liquid being measured, thus impacting the accuracy of the level measurement.

The pressure measurement channel may comprise an accumulator, said accumulator being arranged to collect any liquid drawn from the container into the pressure measurement channel. This acts to prevent any liquid drawn into the pressure measurement channel from contacting the pressure transducer by providing a chamber between the two which will, in use, normally be filled with air at a pressure below atmospheric pressure. It also only requires the pressure measurement channel to be horizontal between the liquid supply channel and the accumulator, and preferably the accumulator is immediately adjacent to the liquid supply channel.

The pressure measurement channel may comprise a diaphragm, which may be provided alternatively or additionally to an accumulator. The diaphragm is arranged to isolate the pressure transducer from any liquid drawn into the pressure measurement channel from contacting the pressure transducer, whilst maintaining fluid communication between the pressure transducer and the conduit.

The pressure measurement channel may branch from the feed tube. Accordingly, the pressure measurement channel branches from the liquid supply channel at a position which is outside of the container.

The first portion of the cap is preferably arranged to be fixed to the container in a permanent or semi-permanent manner to deter or prevent removal by a user. This arrangement may be used in order to prevent a user requiring access into the container and indeed, to prevent a user from gaining access to the container, to thereby ensure a returned container is free from contamination.

To allow the first portion of the cap to be fixed to the container in a permanent or semi-permanent manner, the apparatus may comprise a closure system arranged to prevent or restrict the removal of the cap portion from the container. The closure system may require the use of specific means to remove the portion of the cap from the container. The specific means may therefore be made available only to the manufacturer or supplier of the container, meaning that only the manufacturer or supplier is able to remove the cap portion from the container. Accordingly, a 'closed-loop' distribution system is attained. The closure system may be mechanical, magnetic, or electromechanical. In one embodiment, the closure system may comprise a locking ring fixed to the cap portion, said locking ring comprising a plurality of lugs arranged to engage with corresponding lugs provided on the container neck such that rotation of the cap portion is restricted in at least one direction.

The apparatus may further comprise a liquid valve provided in the first portion of the cap in the liquid flow passage of the cap, the liquid valve being arranged to close the flow passage when the first and second portions of the cap are disconnected so as to prevent the passage of liquid therethrough.

The second portion of the cap may comprise a pin arranged to engage the liquid valve when the two portions are connected, so as to open the liquid valve such that the liquid valve does not resist, to any significant extent, the flow of fluid through it.

With this arrangement of liquid valve in the first portion and pin in the second portion, when the first and second portions are disconnected from each other, for example when the container is in storage or transit, liquid is prevented from exiting the container through the liquid flow passage and thus the container is completely closed without the need to install a separate cap or cover. Furthermore, the first and second portions can be quickly and easily connected, and in doing so the valve is opened, allowing the unimpeded passage of liquid through the liquid supply channel of the conduit when the first and second portions of the cap are connected. This is important to ensure this valve does not otherwise obstruct the flow which may otherwise occur at low flow rates after the means for drawing liquid has been switched off, which would interfere with the partial return of liquid to the container and thus affect the pressure measurement valve.

Advantageously, the container may comprise a vent valve arrange to allow passage of air into the container to replace liquid withdrawn from the container through the liquid supply channel, so as to maintain the headspace of the container at atmospheric pressure.

In a preferred embodiment, the vent valve is provided in the first portion of the cap, and is arranged to be closed when the first portion and the second portion of the cap are disconnected so as to prevent the passage of air through the vent valve. In such an embodiment, the second portion comprises a member arranged to engage with the vent valve when the two portions are connected so as to open the vent valve, such that the passage of air through the vent valve is permitted. Accordingly, when liquid is drawn from the container and subsequently dispensed, the liquid in the container may be replaced by air passing through the vent valve, thus maintaining the headspace of the container at atmospheric pressure.

The pressure measurement channel may branch from the liquid supply channel at a point adjacent to the connector or the second portion of the cap.

Preferably, the feed tube and dip tube are fixed to the cap with the liquid supply channel extending through the feed tube, cap and dip tube with pressure measurement channel branching from the feed tube at a fixed height above the cap. As mentioned above, the feed tube and the dip tube may be portions of a single tube which passes through the cap, but which single tube is fixed to the cap. Alternatively, the feed tube and the dip tube may be separate tubes which are connected by one or more connectors.

The means to draw liquid through the liquid supply channel is preferably a pump connected to the second end of the liquid supply channel. Accordingly, it is not necessary to install a pump within the container in order to dispense liquid from the container.

The apparatus may further comprise a non-return valve, non-return pump, or a valve arranged to be closed on cessation of operation of the pump, said valve being provided between the second end of the liquid supply channel and the point at which the pressure measurement channel branches from the liquid supply channel. Such a valve acts as a stop to hold liquid within the conduit after cessation of operation of the pump.

With the liquid held in the liquid supply channel by the stop, gravity acting on the liquid in the conduit, between the level of the surface of the liquid in the container and the point at which the pressure measurement channel branches from the liquid supply channel, will exert a negative pressure on the pressure transducer, which pressure will be dependent on the level of liquid in the container.

Advantageously, the fixed height of the pressure measurement channel is the same for multiple containers. As described above, the apparatus can thereby be used with multiple containers to reliably measure the level of liquid within each container.

The pressure measurement channel is preferably in fluid communication with the liquid supply channel at a first end and is closed at a second end.

According to another aspect of the present invention, there is provided a system for dispensing liquid from a container, the system comprising an apparatus for monitoring the level of liquid in the container according any one of above described embodiments, and one or more additional containers. Accordingly, there is provided a system comprising a plurality of containers which can be interchanged, such that when one container is empty, it can be replaced with a filled container to continue operation. The original container can subsequently be returned to a supplier and refilled for redistribution.

According to a further aspect of the present invention, there is provided a method of determining the level of a liquid within a container, the method comprising:
  inserting a conduit into said container such that a first end of the conduit is immersed in said liquid in said container and a second end of said conduit extends outside of the container;
  connecting a pressure transducer to a pressure channel of the conduit, which pressure channel is arranged to branch from the conduit between the first and second ends at a fixed height relative to a top of the container;
  drawing liquid from the first end of the conduit to the second end of the conduit;
  stopping drawing liquid through the conduit and activating a stop at the second end of the conduit such that said liquid is held in conduit;
  measuring a pressure within the pressure channel when said liquid is held in the feed tube;
  determining the level of liquid in the container by comparing the measured pressure to one or more reference values.

Preferably, liquid is drawn into the conduit by activating a pump connected to the second end of the conduit.

The method may further comprise: monitoring the pressure within the pressure channel; determining that the pump has been activated in response to the measurement of a pressure value outside of a predetermined range; determining that the pump has stopped in response to the measurement of a pressure value within said predetermined range; recording the measured pressure within the pressure channel a predetermined period of time after the pump has stopped; and determining the level of liquid in the container based on said recorded pressure measurement.

During operation of the pump the closed pressure measurement channel experiences a negative pressure (relative to atmospheric pressure) much greater than any negative pressure experienced by the pressure measurement channel when the system is static. Accordingly, activation of the pump can be automatically detected by measurement of a pressure outside of a predetermined range. Once the pressure measured by the pressure transducer falls back to within the predetermined range, it can be determined that the pumping operation has ceased. Thus, it can be automatically determined that the apparatus is now primed and therefore that the apparatus is in an appropriate state to measure the level of liquid in the container. The pressure within the pressure measurement channel will then depend on the height of the point at which the pressure measurement channel branches from the feed tube relative to the surface of the liquid in the container. This can then be recorded after a predetermined period of time has passed to ensure that the pressures within the apparatus have equilibrated, and the recorded pressure value can be compared to one or more reference values in order to determine the level of liquid within the container. Thus detection of a pressure outside of the predetermined range may effectively be used to trigger a level measurement operation, and furthermore the measurement will be made at the important time, after each cessation of a dispensing cycle.

BRIEF DESCRIPTION OF DRAWINGS

Non-limiting embodiments of the present invention will now be described by way of example only, with reference to the figures in which.

DETAILED DESCRIPTION

Figure 1:
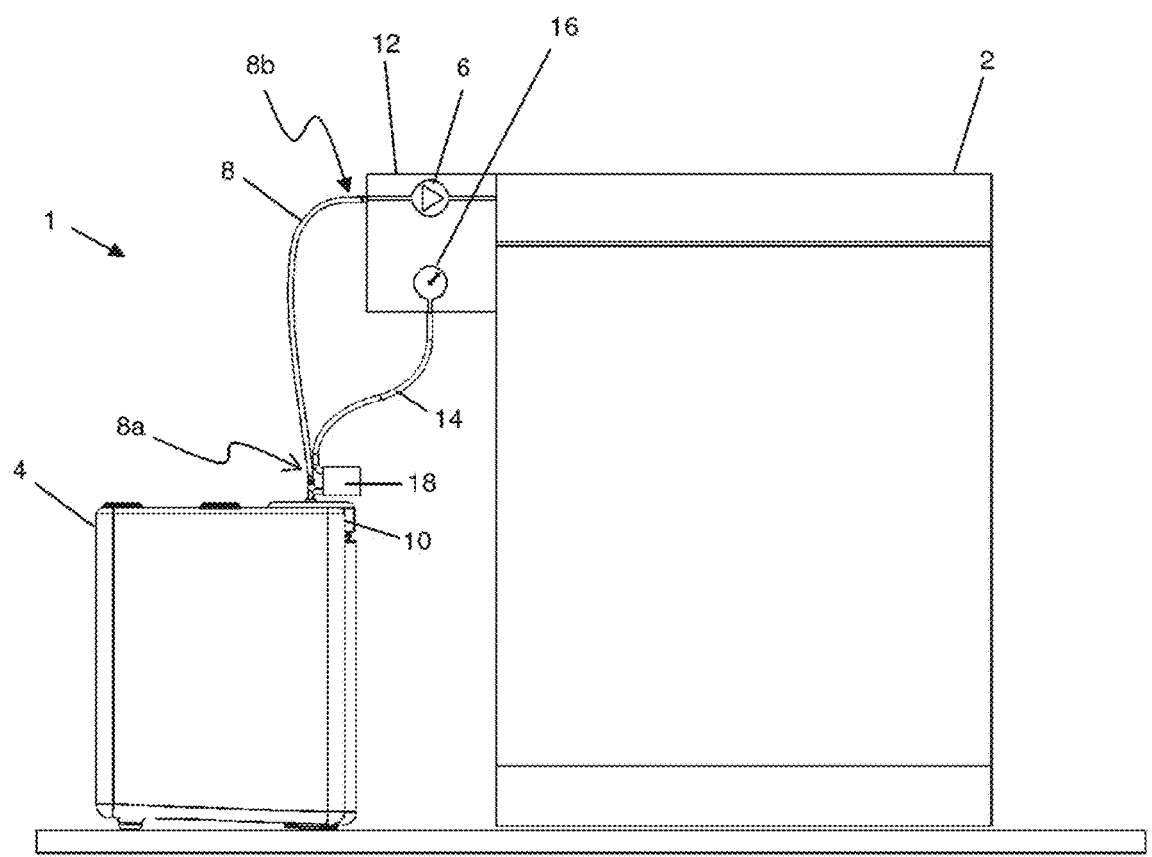
FIG. 1 is a diagram of a dispensing system comprising an apparatus according to an embodiment of the present invention.

With reference to FIG. 1, there is shown a dispensing system comprising a dispensing and level sensing apparatus 1 according to an embodiment of the present invention. The system comprises an appliance 2 in fluid communication with a container 4 containing a liquid, such as a chemical cleaning solution. In the illustrated embodiment, the appliance 2 is a dishwasher, however it will be appreciated that the apparatus of the present invention is equally applicable to any system in which it is desired to dispense liquid from a container and to monitor the level of the liquid within that container. For example, the apparatus may also find particular application to laundry systems.

The apparatus 1 comprises a pump 6 arranged to draw liquid from the container 4 through a feed tube 8 and to dispense the liquid into the appliance 2. The feed tube 8 has a first end 8*a* connected to a cap 10 fitted to the container 4, and a second end 8*b* connected to a control unit 12. In the illustrated embodiment, the pump 6 is provided within the control unit 12, which control unit 12 is separate from, but connected to the appliance 2. However, it will be appreciated that the pump 6 and/or control unit 12 may alternatively be a component part of the appliance 2 and thus may be provided in the appliance 2.

The apparatus 1 further comprises a pressure tube 14 in fluid communication with a pressure transducer 16, which is housed within the control unit 12. In the illustrated embodiment, the pressure tube 14 comprises an accumulator 18, arranged to collect liquid drawn into the pressure tube 14 from the container 4 when the pump 6 is turned off, as will be described in greater detail below.

Figure 2:
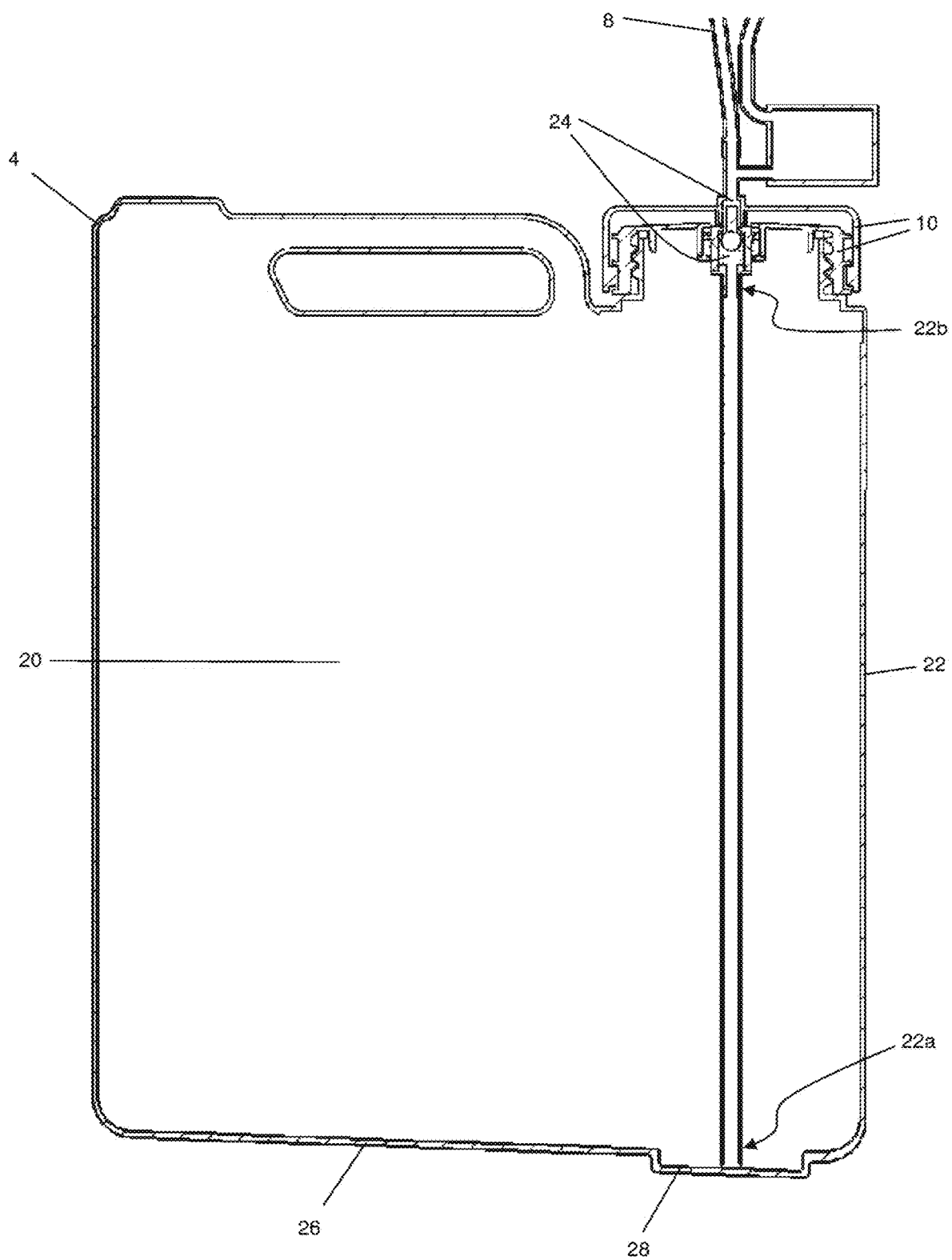
FIG. 2 is a cross-section of a container of the apparatus of FIG. 1.

FIG. 2 is a cross-section of the container 4. The container 4 has an internal cavity 20 suitable for the storage of a liquid. A dip tube 22 is provided in the container 4, having a lower end 22*a* positioned at or near the bottom of the container 4, and an upper end 22*b* connected to the cap 10. The dip tube 22 is in fluid communication with the feed tube 8 through a liquid flow passage 24, which extends through the cap 10. The dip tube 22 extends into the container 4, providing a means through which liquid stored in container 4 can be drawn during a dispensing operation. The container 4 has a sloping base 26, which is sloped towards a sump 28, such that residual liquid in the container 4 collects in the sump 28. The lower end 22*a* of the dip tube 22 is arranged to extend into the sump 28, allowing the maximum possible volume of liquid to be extracted from the container 4 before being replaced.

Figure 3:
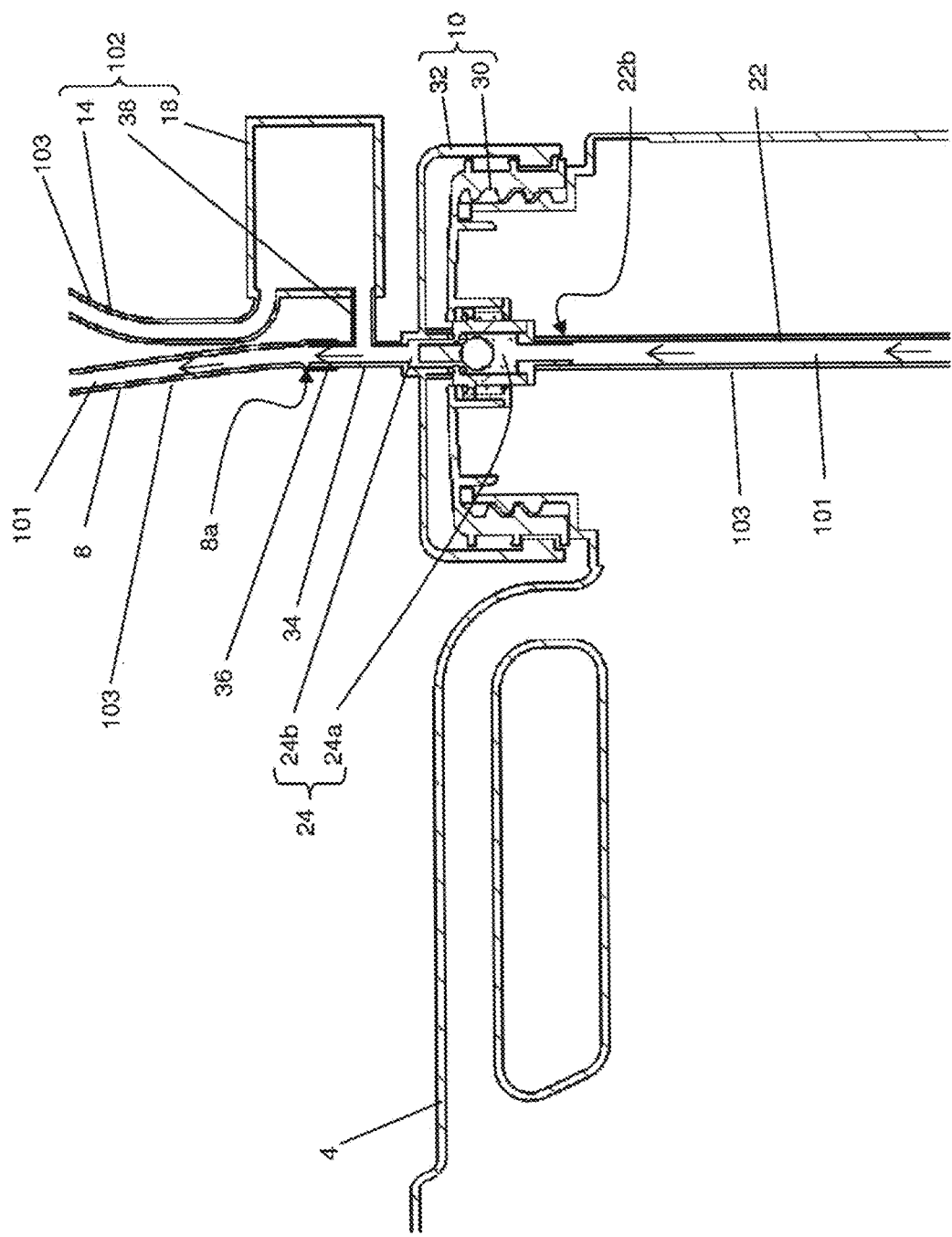
FIG. 3 is an enlarged cross-section of the container of FIG. 2, showing a cap having an outer portion and an inner portion.

FIG. 3 shows in cross section and to an enlarged scale the cap 10 of the container 4. From FIG. 3, the cap 10 is seen to comprise an inner portion 30 arranged to be screwed onto the container 4, or fixed by some other means in a permanent or semi-permanent manner, the inner portion 30 being intended to remain in place and not to be removed by a user, to thereby prevent contamination of the container when in the user's possession. The inner portion 30 may be screwed or otherwise fixed to the container 4 by means which allow only the supplier to remove the inner portion, for example by use of a specialist tool.

The cap 10 further comprises an outer portion 32, which is arranged to releasably connect to the inner portion 30, as will be described in greater detail below.

The liquid flow passage 24 extends through the cap 10 to allow the passage of liquid through the cap 10 during a dispensing operation. The liquid flow passage 24 comprises a first portion 24*a*, which extends through the inner portion 30 of the cap 10, and a second portion 24*b* which extends through the outer portion 32 of the cap 10. When the cap 10 is assembled by connecting the outer portion 32 to the inner portion 30, the first portion 24*a* engages with the second portion 24*b* to form the liquid flow passage 24, such that the liquid flow passage 24 extends through the inner portion 30 and the outer portion 32 of the cap 10.

The upper end 22*b* of the dip tube 22 is fluidly connected to the first portion 24*a* of the liquid flow passage 24, and the first end 8*a* of the feed tube 8 is fluidly connected to the second portion 24*b* of the liquid flow passage 24, such that a fluid connection is formed between the dip tube 22 and the feed tube 8, through the liquid flow passage 24. The dip tube 22, the liquid flow passage 24 and the feed tube 8 collectively define a liquid supply channel 101 of the apparatus 1, which liquid supply channel 101 is arranged to supply liquid from the container 4 to the appliance 2 by action of the pump 6, in the direction indicated by the arrows shown in FIG. 3.

A T-piece 34 is connected to the outer portion 32 of the cap 10, which T-piece 34 is fluidly coupled to the second portion 24*b* of the liquid flow passage 24. The T-piece 34 comprises a vertically extending portion 36, which, in use, is aligned with the dip tube 22 and extends along an axis substantially parallel to an axis of the dip tube 22. The feed tube 8 is connected to the vertically extending portion 36, such that the vertically extending portion 36 effectively forms an end portion of the feed tube 8, which is fluidly connected to the liquid flow passage 24 of the cap 10. The vertically extending portion 36 therefore forms a part of the liquid supply channel 101.

The T-piece 34 further comprises a horizontally extending portion 38, branching from the vertically extending portion 36 along an axis substantially perpendicular to the axis of the vertically extending portion 36. The accumulator 18 is provided in between the horizontally extending portion 38 and the pressure tube 14. The horizontally extending portion 38, the accumulator 18 and the pressure tube 14 collectively define a pressure measurement channel 102, which branches from the feed tube 8 at a fixed height relative to the outer portion 32 of the cap 10. Thus, when the outer and inner portions 30, 32 of the cap 10 are connected, the pressure measurement channel 102 branches from the feed tube 8 at a fixed height relative to the cap 10 and thus to the lower end 22*a* of the dip tube 22.

In combination, the liquid supply channel 101 and the pressure measurement channel 102 define a branched conduit 103 which is arranged to be connected to the container 4. Liquid stored in the container 4 can be dispensed through the liquid supply channel 101 of the conduit 103, and measurement of the pressure within the pressure measurement channel 102 of the conduit 103 allows the level of liquid stored within the container 4 to be determined, as will be described in detail below.

Figure 4:
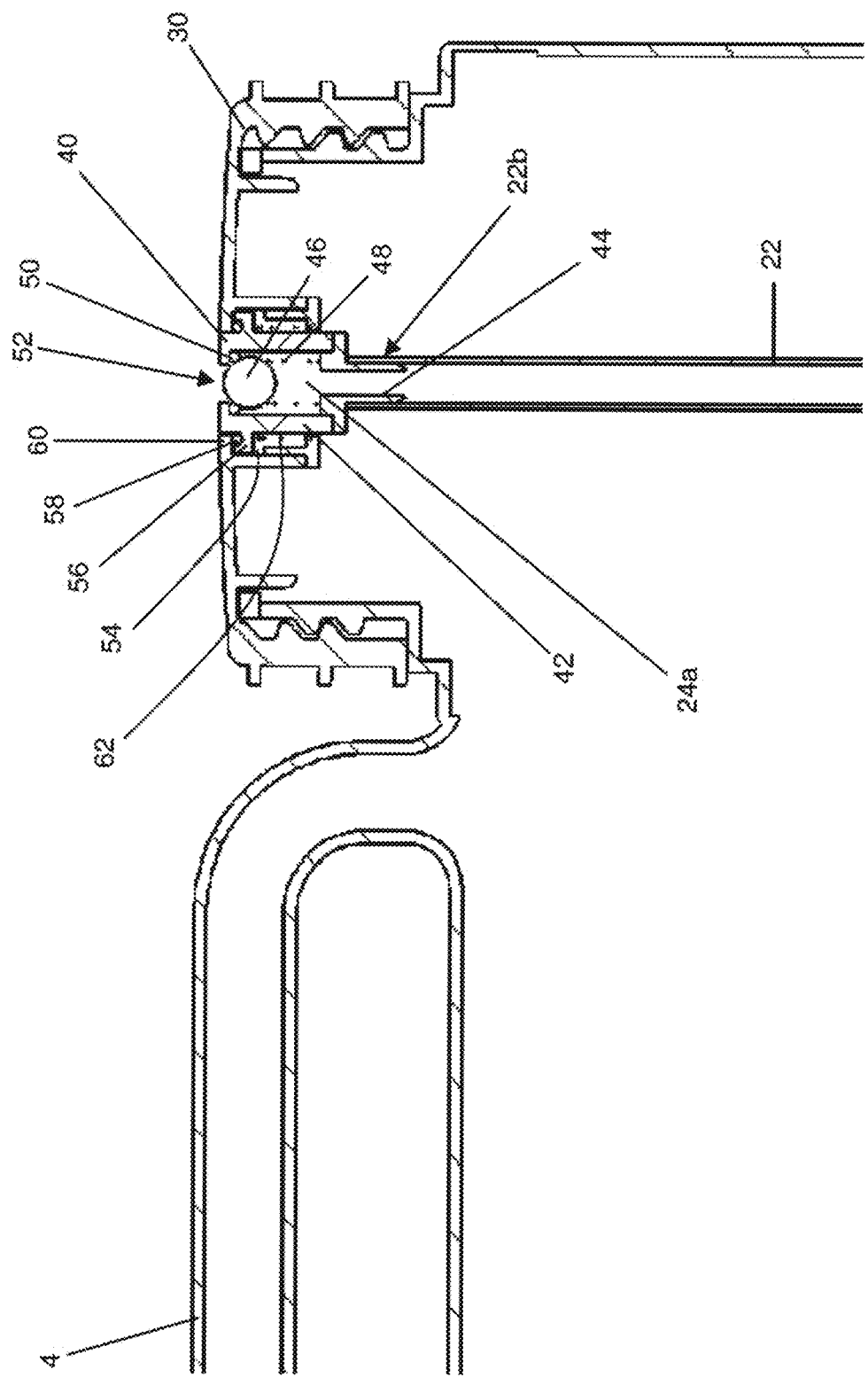
FIG. 4 is an enlarged cross-section of the container of FIG. 2, with only the inner portion of the cap connected to the container.

FIG. 4 shows in cross section and, to an enlarged scale, the upper portion of container 4 according to one embodiment of the present invention. In the illustrated embodiment, the inner portion 30 of the cap 10 is fitted to the container 4, however the outer portion 32 is disconnected and removed. A liquid valve 40 is provided in the inner portion 30 of the cap 10, the liquid valve 40 comprising a substantially cylindrical outer wall 42. A connector 44 having a relatively reduced diameter extends from a lower end of the outer wall 42, which connector 44 connects to the upper end 22b of the dip tube 22. The outer wall 42 and the connector 44 collectively define the first portion 24a of the liquid flow passage 24.

The liquid valve 40 further comprises a ball 46 located in the first portion 24a of the liquid flow passage 24, which ball 46 is biased to a raised position by a spring 48, such that the ball 46 engages with a seal 50 provided around the periphery of an outlet 52 of the liquid valve 40, so as to prevent the passage of liquid through the outlet 52. Accordingly, when the liquid valve 40 is in a raised configuration, as shown in FIG. 4, the passage of liquid through the first portion 24a of the liquid flow passage 24 is prevented.

The inner portion 30 of the cap 10 further comprises a vent valve 54. The vent valve 54 is formed by a flange 56 provided around the outer periphery of the outer wall 42 of the liquid valve 40. A vent seal 58 is provided on the upper surface of the flange 56, the vent seal 58 being arranged to engage with a lip 60 of the inner portion 30 of the cap 10, so as to form a gas-tight seal with lip 60. The outer wall 42 of the liquid valve 40 is biased to a raised position by a vent spring 62, such that the vent seal 58 engages with an underside of the lip 60 when outer wall 42 is in a raised position. Accordingly, when the vent valve 54 is in a raised configuration, as shown in FIG. 4, the passage of any fluid, whether gas or liquid, through the vent valve 54 is prevented. The headspace of container 4 is therefore sealed in a gas-tight manner by the vent valve 54.

By virtue of the liquid valve 40 and the vent valve 54, when the inner portion 30 of the cap 10 is fitted to the container, and the outer portion 32 is disconnected therefrom, the container 4 is closed and any liquid stored in the container 4 is prevented from leaking out of the container 4, without the need for a further cap, lid or other cover to be fitted to the container 4.

Figure 5:
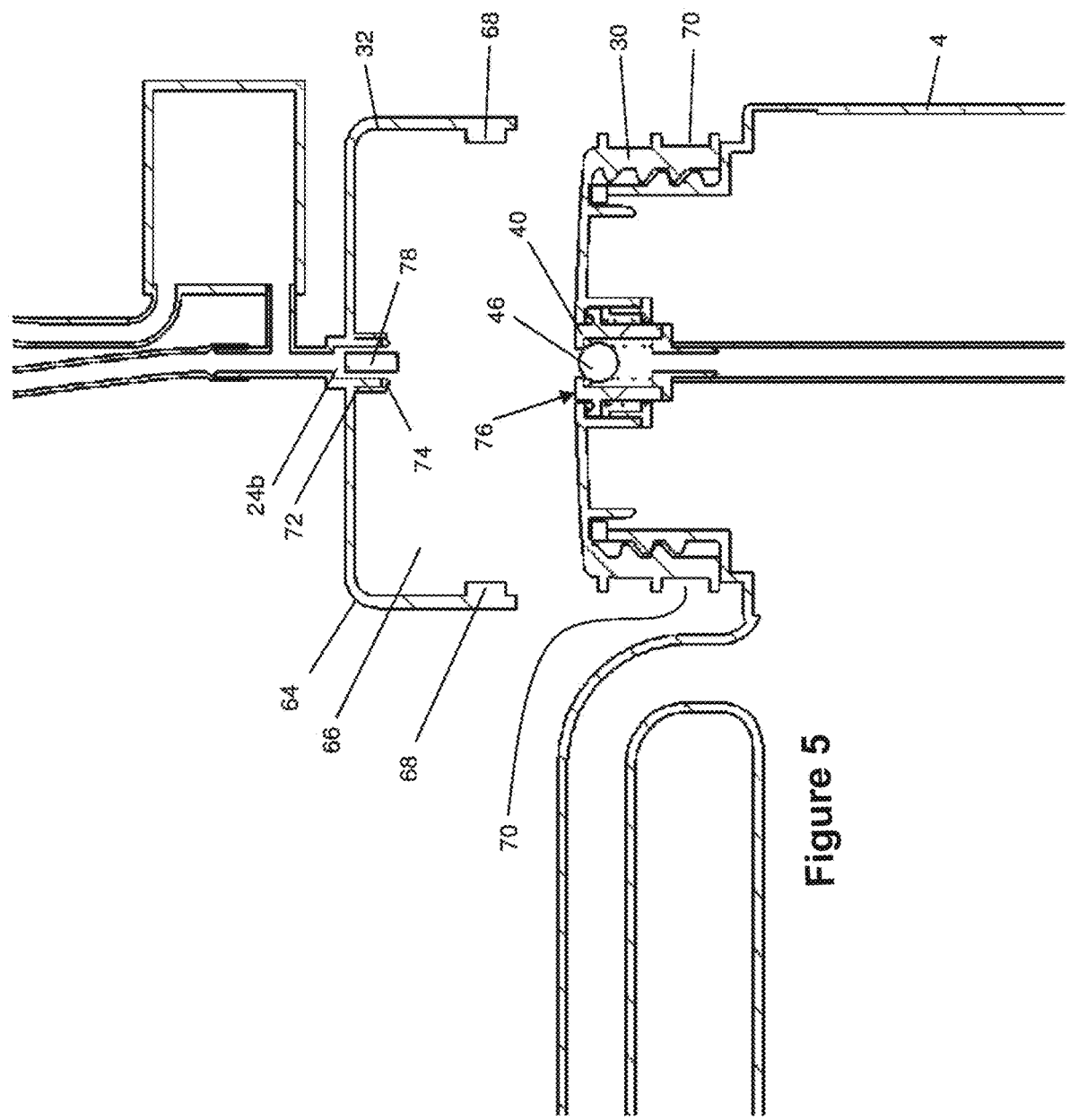
FIG. 5 is an enlarged cross-section of the container of FIG. 2, showing the outer portion and inner portion of the cap in a disconnected state.

FIG. 5 shows both the outer portion 32 and the inner portion 30 of the cap 10 in a disconnected state. The outer portion 32 comprises a cover 64 defining a space 66 inside of cover 64, the space 66 being sized and shaped to accommodate the inner portion 30. The cover 64 comprises retaining members 68 arranged to engage recesses 70 formed in the inner portion 30. The second portion 24b of the liquid flow passage 24 extends through the cover 64, and is defined by a substantially cylindrical wall 72. A seal 74 is provided on the lower edge of the wall 72, which seal 74 is arranged to sealingly engage with an upper surface 76 of the liquid valve 40 when the inner portion 30 and the outer portion 32 are connected. A pin 78 is provided within the second portion 24b of the liquid flow passage 24, the pin 78 being positioned to engage with the spring-loaded ball 46 of the liquid valve 40 when the outer portion 32 and the inner portion 30 are connected.

Figure 6:
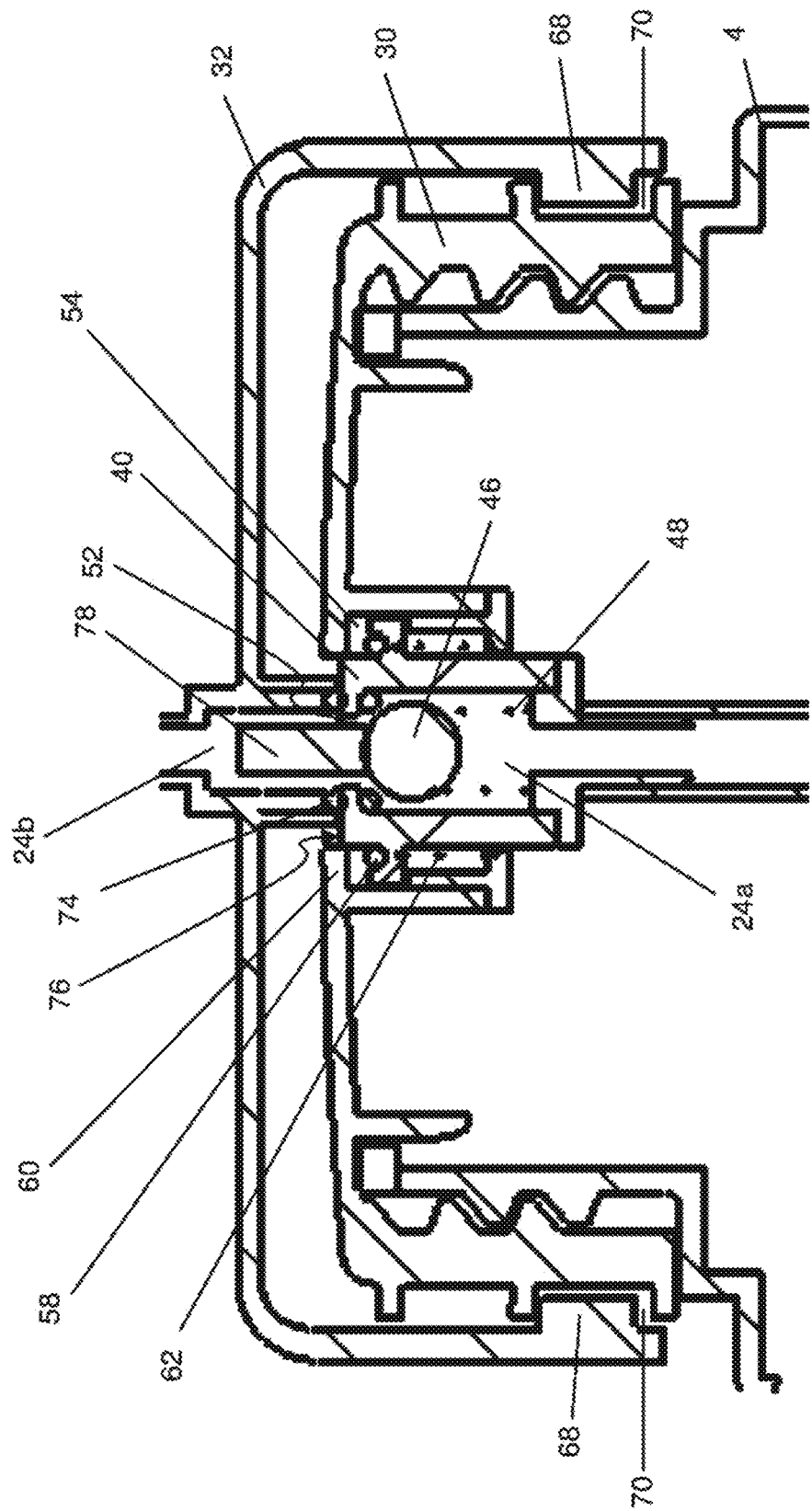
FIG. 6 is an enlarged cross-section of the container of FIG. 5, showing the outer portion and the inner portion of the cap in a connected state.

FIG. 6 shows, on an enlarged scale, the inner portion 30 and the outer portion 32 of the cap 10 when connected. When the outer portion 32 of the cap 10 is connected to the inner portion 30, the retaining members 68 are received in the recesses 70, so as to retain the outer portion 32 on the inner portion 30, thereby fixing the outer portion 32 to the container 4. At the same time, the seal 74 provided on the lower edge of the wall 72 engages with the upper surface 76 of the liquid valve 40, so as to impart a downward force upon the liquid valve 40, such that the vent spring 62 is compressed and the liquid valve 40 is depressed into a lowered position. Accordingly, the gas-tight seal formed between the vent seal 58 and the lip 60 of the inner portion 30 is broken, providing a ventilation path to allow air to enter (or exit) the container 4 through the vent valve 54.

Simultaneously, the pin 78 imparts a downward force on the spring-loaded ball 46 so as to compress the liquid valve spring 48 and depress the ball 46 into a lowered position relative to the liquid valve seal 50. Accordingly, the seal formed between the liquid valve seal 50 and the ball 46 is broken, thus allowing the passage of liquid from the first portion 24a of the liquid flow passage 24 to the second portion 24b of the liquid flow passage 24, through the liquid valve outlet 52. It will be appreciated that when the pin 78 and the ball 46 are engaged, the passage of liquid through the liquid flow passage 24 is not impeded in any way.

Since the vent seal 74 is arranged to engage with the upper surface 76 of the liquid valve 40, connecting the outer portion 32 to the inner portion 30 provides a sealed liquid connection between the dip tube 22 and the feed tube 6, through the liquid flow passage 24 of the cap 10. As described above with reference to FIG. 3, the dip tube 22, the liquid flow passage 24 and the feed tube 8 thereby collectively define the liquid supply channel 101. Accordingly, liquid can be drawn from the container 4, into the liquid supply channel 101 through the lower end 22a of the dip tube 22, and can ultimately be supplied to the appliance 2 through the liquid supply channel 101.

With the arrangement described above, when the outer portion 32 is disconnected from inner portion 30, the container 4 is completely closed and any liquid stored within the container 4 is prevented from leaking out of the container 4. However, when the outer portion 32 is connected to inner portion 30, the liquid supply channel 101 is formed, which allows liquid to be drawn from the container 4 and to be supplied to the appliance 2. At the same time, the vent valve 54 is opened, allowing air to enter the headspace of the container 4 to replace any dispensed liquid, thus maintaining the headspace of the container 4 at atmospheric pressure during a dispensing operation.

It will be appreciated that whilst the above-described arrangement is a preferred embodiment of the present invention, a liquid supply channel could alternatively be defined by a single tube extending through the cap but fixed to the cap, thus providing a liquid supply channel from the container to an appliance connected to an end of the single tube. Alternatively, the dip tube and the feed tube may be separate components connected to opposing channels of an adapter or T-piece to define a liquid supply channel, without the inclusion of the liquid valve or the vent valve described above. Alternative means for venting the headspace of the container may be provided.

Figure 7:
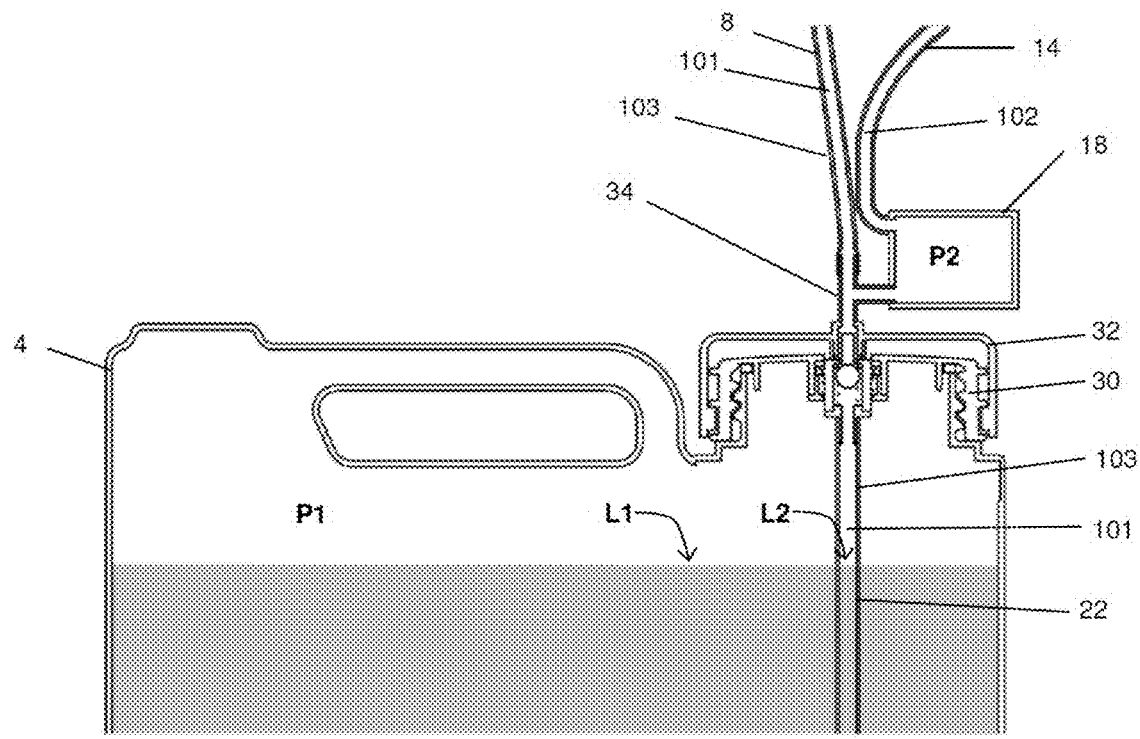
FIG. 7 is a cross-section of the apparatus after initial connection of the inner and outer portions.

FIG. 7 shows the apparatus 1 after initial connection of the outer portion 32 to the inner portion 30 when the container 4 is filled with liquid. Since the pressure within the headspace of container 4 and within the conduit 103 are equal (i.e. at atmospheric pressure), liquid within the conduit 103 extends to a level L2 within the dip tube 22 which is equal to the level of liquid L1 within the container 4.

Figure 8:
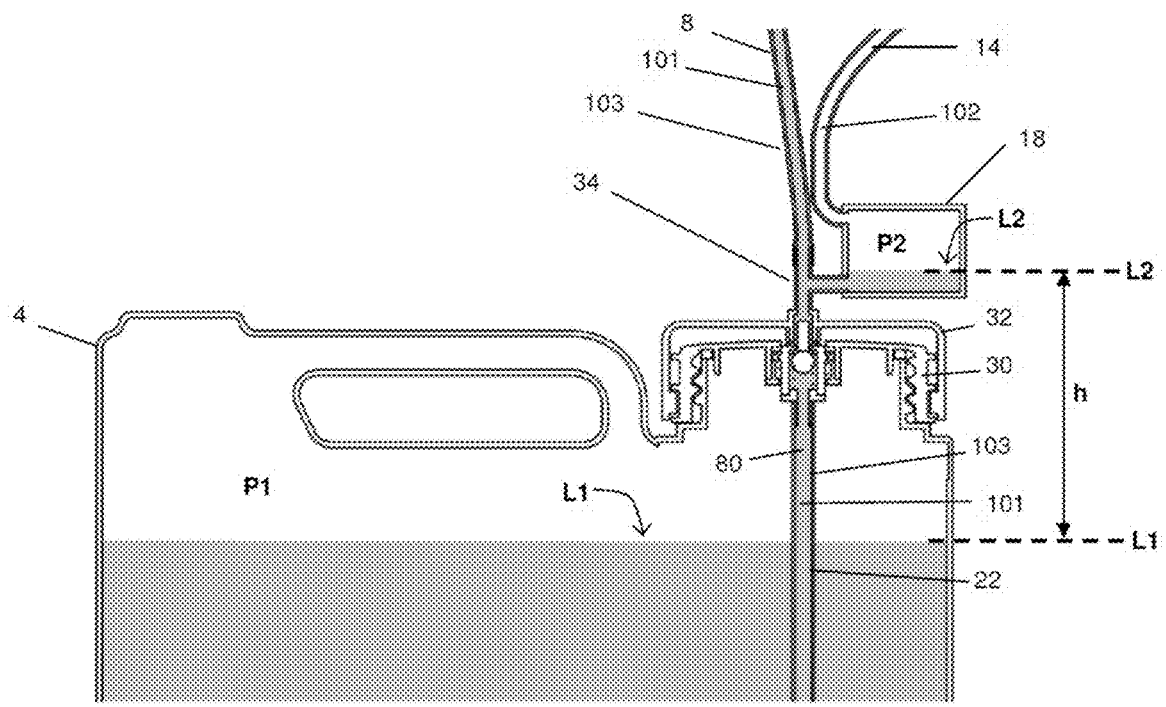
FIG. 8 is a cross-section of the apparatus of FIG. 7 in a primed state.

In order to dispense liquid from the container 4, the pump 6 is activated so as to draw liquid from the container 4, through the liquid supply channel 101 (comprising dip tube 22, liquid flow passage 24 and feed tube 6) before dispensing the liquid into the appliance 2. Once the air within the liquid supply channel 101 has been displaced by liquid from the container 4, the pump 6 is stopped leaving the apparatus 1 in a primed state, as shown in FIG. 8. The pump 6 may be operated for an amount of time sufficient to dispense a desired amount of liquid into the appliance 2. Alternatively, the pump 6 may be operated for an amount of time sufficient only to prime the apparatus, with little or no liquid being dispensed into the appliance 2. In either case, the apparatus 1 is in the primed state after operation of the pump 6. When in the primed stated, liquid is held within the liquid supply channel 101 by the action of a stop valve forming an integral part of the pump 6. The valve may alternatively be a non-return valve or any other valve in the feed tube 8 above the T-piece 34 arranged to be closed on cessation of operation of the pump. The valve is provided between the appliance 2 and the point at which the pressure measurement channel 102 branches from the feed tube 8. Alternatively, a non-return pump may be used to draw liquid through the liquid supply channel 101, such that liquid is held within the liquid supply channel 101 upon cessation of operation of the pump 6.

As liquid is drawn from the container 4 through the liquid supply channel 101, air is drawn into container 4 through vent valve 52, such that the pressure P1 within the headspace of container 4 remains at atmospheric pressure during and after the dispensing operation. At the same time as drawing liquid from the container 4, the operation of the pump 6 draws air out of the pressure measurement channel 102 (comprising pressure tube 14 and accumulator 18), thus generating a reduced pressure P2 in the pressure measurement channel 102 whilst the pump 6 is operating. As a result, some liquid is drawn back into the accumulator 18 after the pump 6 has stopped, as illustrated in FIG. 8.

FIG. 8 shows the apparatus 1 in a primed state immediately after the pump 6 has stopped. Liquid with the container 4 extends to a first level L1, and liquid within the conduit 103 extends to a second level L2 in the pressure measurement channel 102 of the conduit 103. Accordingly, a column of liquid 80 having a height h exists within the conduit 103, which column of liquid 80 extends from the container liquid level L1 to the conduit liquid level L2. Gravity acting upon the column of liquid 80 exerts a pressure P2 upon the pressure measurement channel 102, which pressure P2 is negative relative to atmospheric pressure. The pressure P2 within the pressure measurement channel 102 is dependent upon the height h of the column of liquid 80, as described in the following passages.

The apparatus 1 of the present invention exploits the pressure differential ΔP between the pressure P1 within the headspace of the container 4 and the pressure P2 within the pressure measurement channel 102, the latter being measurable by the pressure transducer 16. The pressure differential ΔP is a function of the density of the liquid and the height h of the column of liquid 80. The vent valve 54 maintains pressure P1 at atmospheric pressure, and thus P1 can be considered to be constant. Accordingly, pressure P2 is dependent upon the height h of the column of liquid 80 only.

The height h of the column of liquid 80 is the difference between the conduit liquid level L2 and the container liquid level L1. Since the pressure measurement channel 102 branches from the feed tube 8 at a fixed height relative to the bottom of the dip tube 22, the conduit liquid level L2 is effectively constant when the apparatus 1 is assembled and in a primed state. Thus, the height h of the column of liquid 80 is dependent upon container liquid level L1 only. Therefore, the measured pressure P2 depends only upon the container liquid level L1.

Accordingly, the apparatus 1 can be calibrated by measuring the pressure P2 for a range of known container liquid levels, where the density of the liquid is also known, and storing the measured values as calibration data. The calibration data can subsequently be used to determine an unknown container liquid level L1, by measuring the pressure P2 within the pressure measurement channel 102, and by comparing the measured pressure P2 to the calibrated pressure values for known container liquid levels.

For example, in a basic embodiment of the invention, calibration may be carried out by measuring the pressure P2 when the container is 100% full, 50% full and 5% full. Subsequently, a measured pressure P2 for a container having an unknown container liquid level L1 can be compared to the calibration values in order to determine the container liquid level D. It will be appreciated that it is desirable to obtain a larger number of calibration points in order to increase the accuracy of the calibration.

Figure 9B:
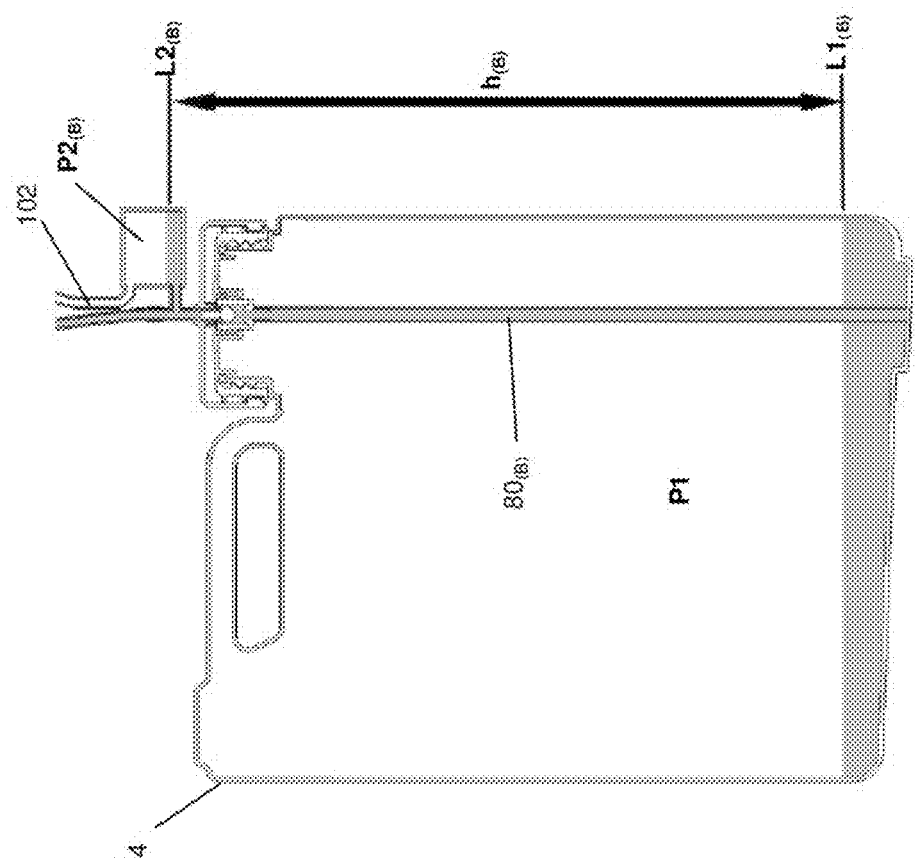
FIG. 9B is a cross-section of the apparatus with a low liquid level in the container.
Figure 9A:
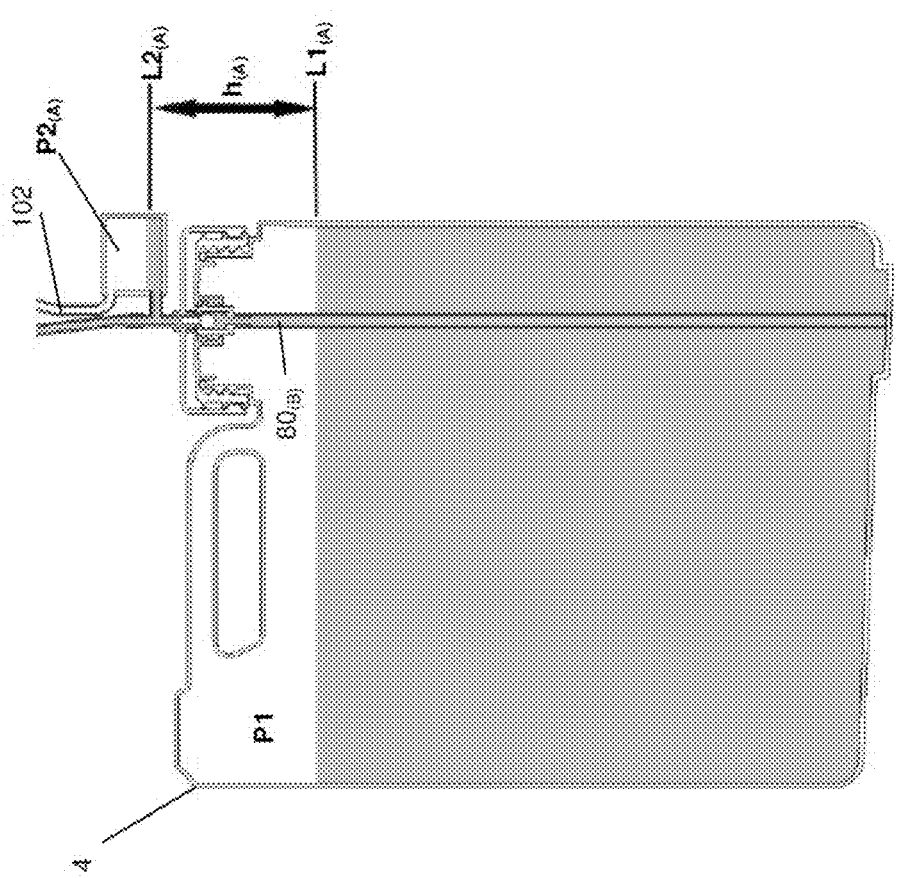
FIG. 9A is a cross-section of the apparatus with a high liquid level in the container.

The operating principle for determining the container liquid level L1 using the apparatus 1 is further illustrated in FIG. 9A and FIG. 9B, which show the container 4 filled to two different levels $L1_{(A)}$ and $L1_{(B)}$. Prior to priming the apparatus 1 for the first time, the pressure P2 within the pressure measurement channel 102 is at atmospheric pressure. This 'starting pressure' before priming is set to zero, such that any subsequent pressure measured by the pressure transducer 16 which is greater than atmospheric pressure will return a positive pressure reading (relative to atmospheric pressure), and any pressure measurement which is less than atmospheric pressure will return a negative pressure reading (relative to atmospheric pressure).

In FIG. 9A, the container 4 is filled to a maximum level, and thus the container liquid level $L1_{(A)}$ is relatively high. Accordingly, the height $h_{(A)}$ of the column of liquid $80_{(A)}$, that is to say the difference in height between the conduit liquid level $L2_{(A)}$ and the container liquid level $L1_{(A)}$, is relatively small. Accordingly, the pressure $P2_{(A)}$ within the pressure measurement channel 102, as measured by pressure transducer 16, has a small negative value relative to atmospheric pressure.

In contrast, in FIG. 9B, the container liquid level $L1_{(B)}$ is relatively low compared to the conduit liquid level $L2_{(B)}$. Accordingly, the height $h_{(B)}$ of the column of liquid $80_{(B)}$ is larger than $h_{(A)}$, and a greater negative pressure is exerted upon the pressure transducer 16. Thus the measured pressure $P2_{(B)}$ is more negative than $P2_{(A)}$, relative to atmospheric pressure.

In some embodiments of the present invention, the apparatus 1 may further comprise an additional pressure transducer and or a temperature probe arranged to measure the pressure and/or temperature within the headspace of the container 4. Thus, any fluctuation in the ambient conditions of container, that is to say atmospheric temperature and pressure, can be taken into account during the calculation of the level of liquid within the container 4. However, it will be appreciated that in the majority of circumstances, any variation in atmospheric pressure and density of the liquid due to temperature changes will be negligible.

Figure 10:
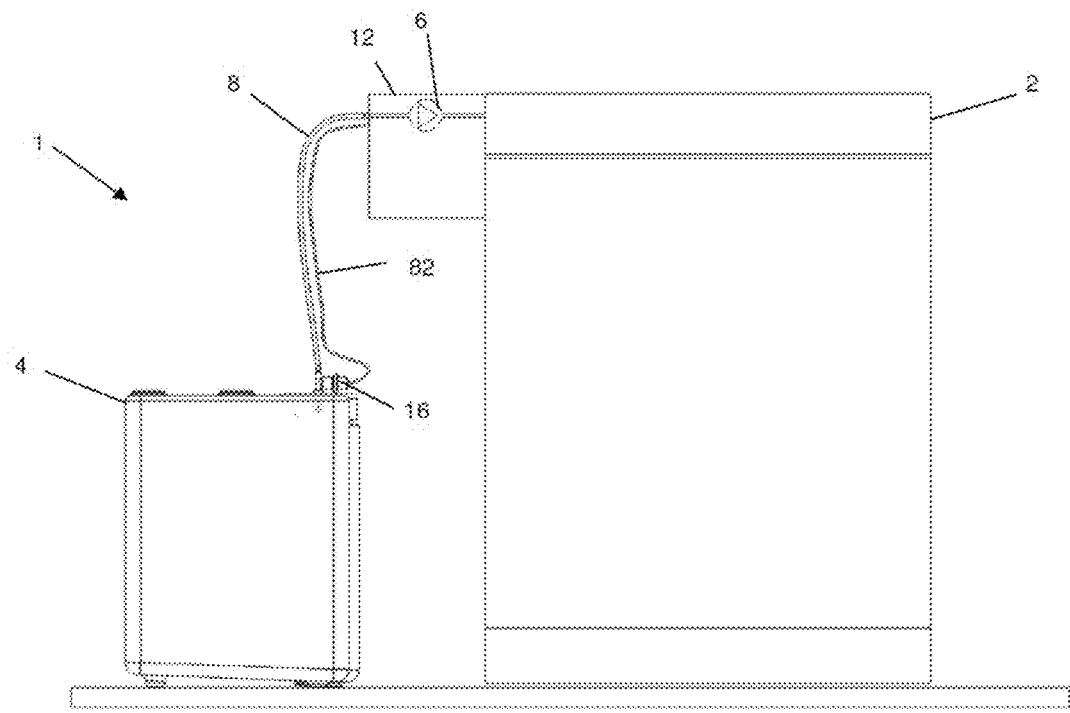
FIG. 10 is a diagram of a dispensing system comprising an apparatus according to a second embodiment of the present invention.
Figure 11:
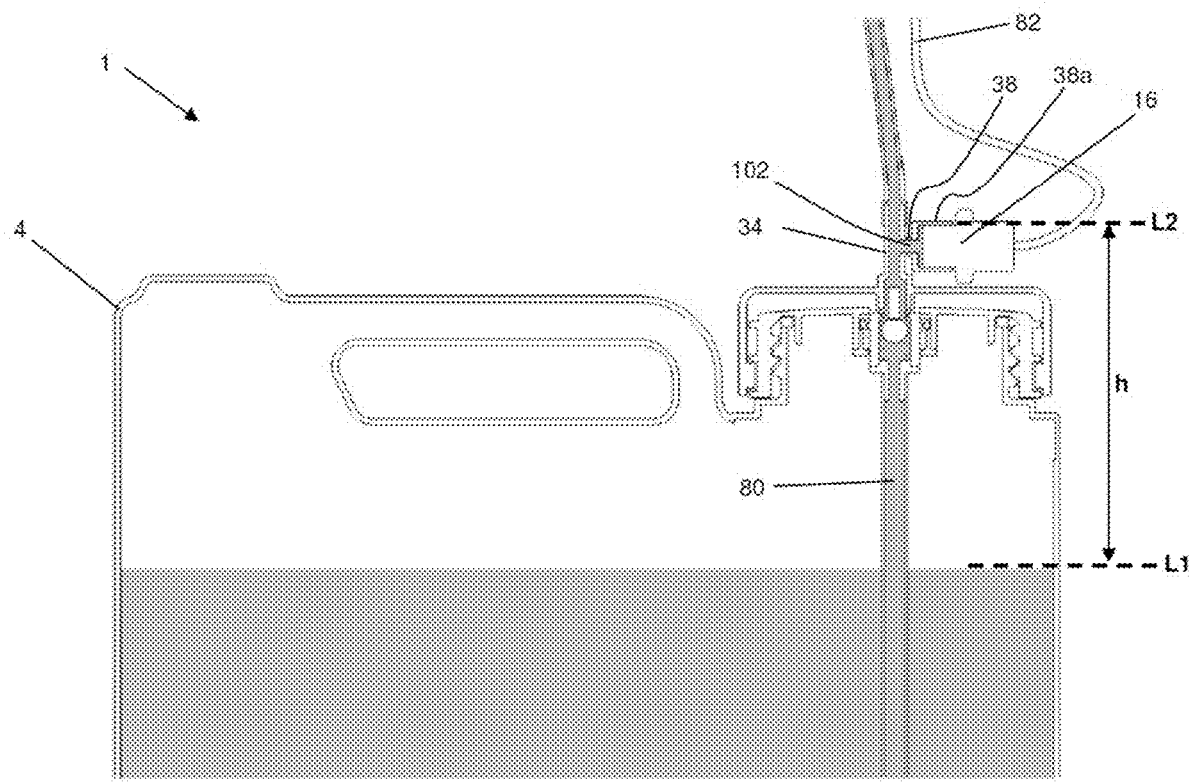
FIG. 11 is an enlarged cross-section of the apparatus of FIG. 10.

FIGS. 10 and 11 show an apparatus for dispensing liquid from a container and for monitoring the level of liquid within said container according to an alternative embodiment of the present invention. The apparatus 1 of FIGS. 10 and 11 differs from the embodiment described above, in that the pressure tube and the accumulator are omitted and the pressure transducer 16 is connected directly to the horizontally extending portion 38 of the T-piece 34. Accordingly, the horizontally-extending portion defines the pressure measurement channel 102. In order to accommodate the pressure transducer 16, the horizontally extending portion 38 has an expanded diameter portion 38a, into which the pressure transducer 16 is received. A signal cable 82 connects the pressure transducer 16 to the control unit 12. This arrangement eliminates the need for an accumulator to be incorporated within the pressure measurement channel 102.

In the embodiment of FIGS. 10 and 11, the reduced pressure created within the pressure measurement channel 102 by the action of pump 6 during the priming and/or dispensing operation again causes some liquid to be drawn into the pressure measurement channel 102, and the liquid to come into direct contact with the pressure transducer 16. Accordingly, in applications where the liquid to be dispensed by the apparatus 1 is a caustic cleaning solution, or any other corrosive or otherwise hazardous chemical solution, it is preferable that at least the exposed portion of the pressure transducer 16 is formed of a material which is resistant to such corrosion. Where the liquid to be dispensed is a caustic soda solution, the pressure transducer 16 may preferably be formed of a corrosion-resistant stainless steel.

The apparatus 1 of FIGS. 10 and 11 can be used to dispense liquid and determine the container liquid level L1 by the same method described above in relation to the first embodiment. The column of liquid 80 extending between the container liquid level L1 and the conduit liquid level L2 exerts a negative pressure upon the pressure transducer 16, which can be measured and used to determine the level of liquid L1 within the container 4.

Figure 12:
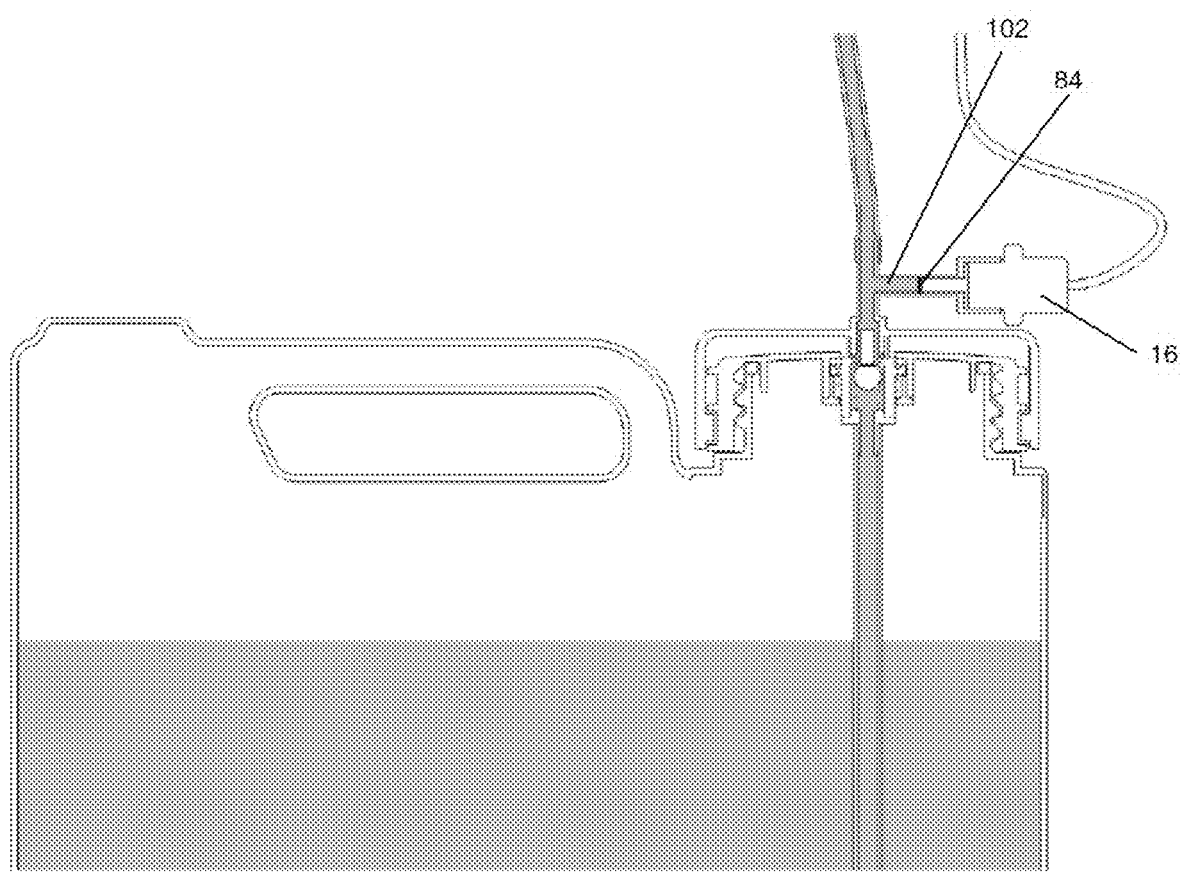
FIG. 12 is a cross-section of an embodiment similar to that illustrated in FIG. 11, but with the addition of a diaphragm.

In a further embodiment of the present invention illustrated in FIG. 12, the pressure measurement channel may comprise a diaphragm 84 arranged to isolate the pressure transducer from any liquid in the pressure measurement channel 102. At least the portion of the diaphragm 84 which is in contact with the liquid is formed of a corrosion-resistant material.

Figure 13:
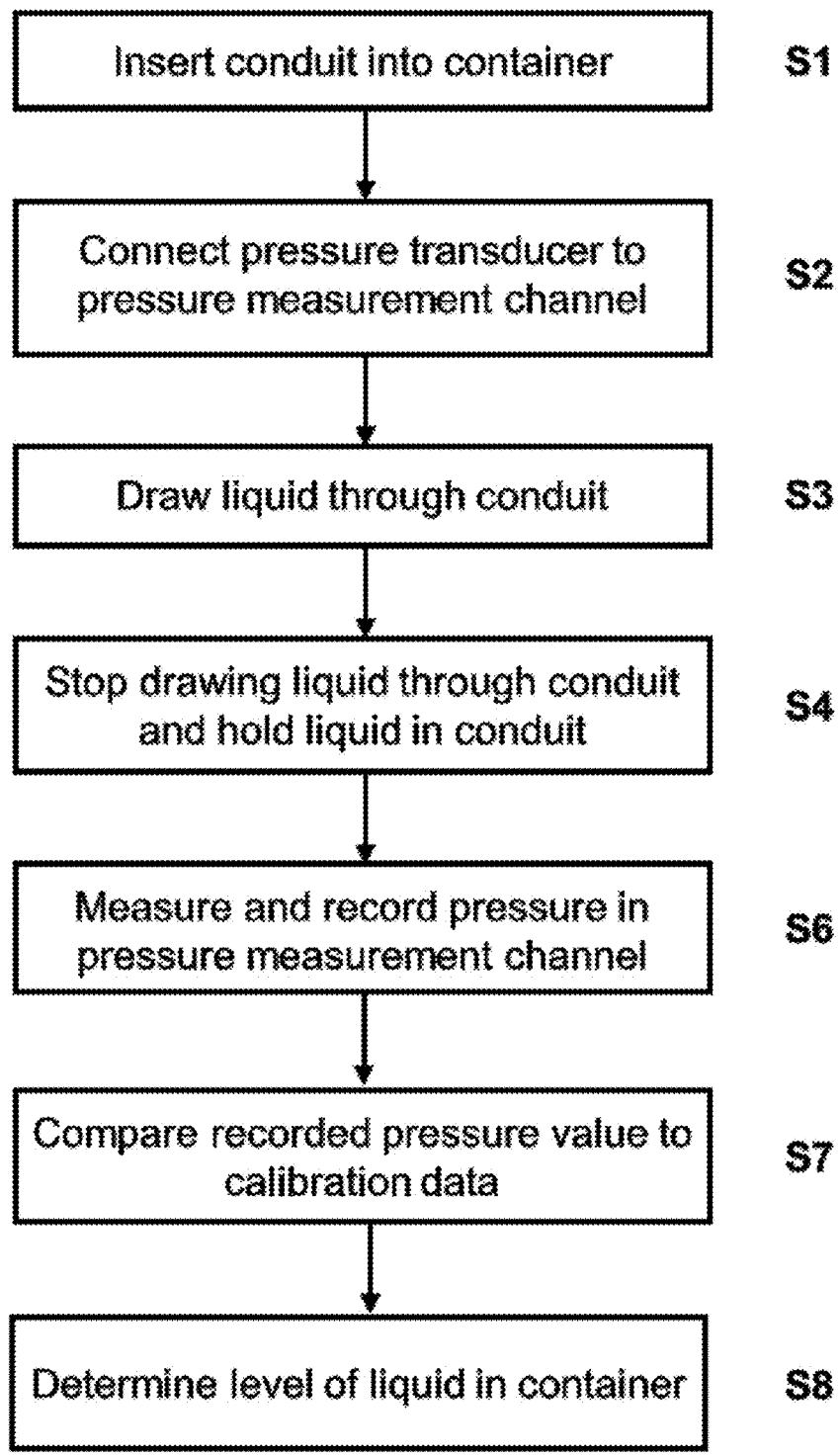
FIG. 13 is a flow diagram of a method of determining the level of liquid in a container according to an embodiment of the present invention.

A preferred method of measuring the level of liquid within the container using an apparatus according to the present invention, embodiments of which are described above, will now be described with reference to FIG. 13.

The apparatus 1 is first connected to the container 4 as described above (S1, S2). After connection of the conduit 103 to the container 4, the pressure P1 in the headspace of container 4 will be equal to the pressure P2 in the pressure measurement channel 102. That is to say, both the headspace above the liquid within the container 4 and the headspace above the liquid within the liquid supply channel 101 will be at atmospheric pressure. The level of liquid in container 4 and within the liquid supply channel 101 will therefore be equal as shown in FIG. 6.

The apparatus 1 is primed by operating the pump 6 so as to draw liquid from the container 4, through the dip tube 22, into the feed tube 8 through the first end 8a thereof, and to dispense the liquid through the second end 8b of the feed tube 8 (S3). The pump 6 is then stopped and liquid is held within the liquid supply channel 101 by the action of a non-return valve in the pump 6 (S4). It will be appreciated that alternative embodiments of the invention may comprise alternative means to hold liquid within the liquid supply channel 101 after cessation of operation of the pump 6. For example, a non-return valve may be used. After cessation of operation of the pump 6, the apparatus 1 is in a primed state. The priming operation may also be a dispensing operation, in which liquid is dispensed through the second end 8b of the feed tube 8 and into appliance 2.

Once the apparatus 1 is in a primed state, the pressure P2 within pressure measurement channel 102 is measured by the pressure transducer 16, the value recorded by the control unit 10 (S6) and compared to calibration data (S7) in order to determine the level of liquid within the container 4 in the manner described above (S8).

Figure 14:
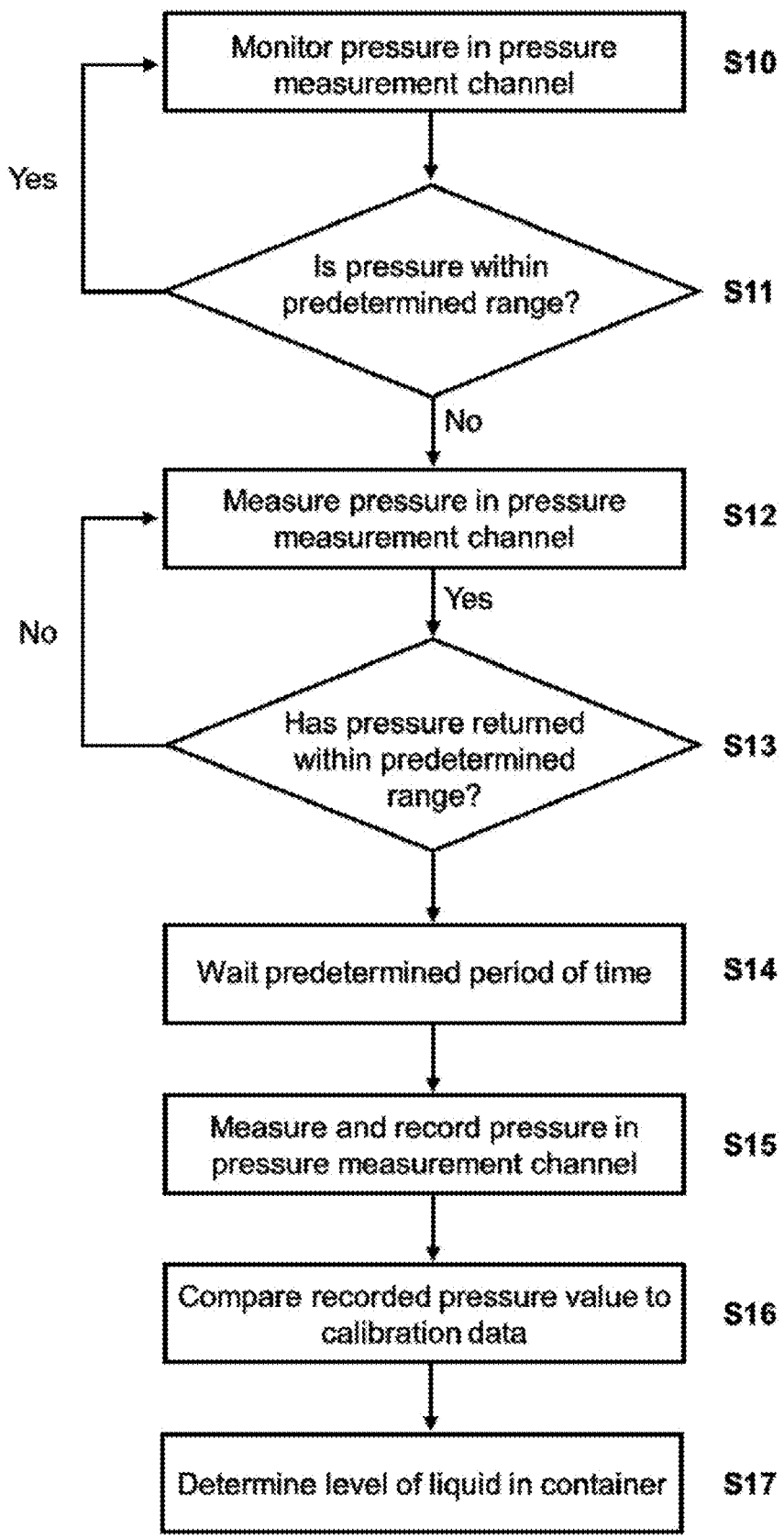
FIG. 14 is a flow diagram of a method of determining the level of liquid in a container according to another embodiment of the present invention.

FIG. 14 illustrates further optional steps in the method of measuring the level of liquid in the container 4. In order to determine that the apparatus 1 is in a primed state, and therefore that it is in an appropriate state to measure the level of liquid within the container 4, the control unit 10 may be configured to continuously or continually monitor the pressure P2 measured by the pressure transducer 16 (S10). During operation of the pump 6, the pressure transducer 16 will measure a negative pressure much greater than any negative pressure measured by the pressure transducer 16 when the apparatus is static, that is to say when the pump 6 is not in operation. Thus, the control unit 10 can be configured to determine that the pump 6 is in operation in response to the measurement of a pressure value P2 which falls outside of a predetermined range, the predetermined range being a range of normally expected pressure values for the pressure measurement channel 102 when the apparatus is static (S11). When the measured pressure P2 returns to a value which is within the predetermined range, it can be determined that the pump 6 has ceased operation (S12, S13). The control unit 10 is then configured to allow the pressure within the apparatus 1 to equilibrate for a predetermined period of time after cessation of operation of the pump 6 (S14), before recording the pressure P2 measured by the pressure transducer 16 (S15) and using the recorded pressure measurement to determine the level of liquid within the container 4 in the manner described above (S16, S17). The control unit 10 is thereby configured to automatically detect when the apparatus 1 is in an appropriate condition to measure the level of liquid within the container 4. The control unit 10 can therefore be programmed to monitor the level of liquid within the container 4 throughout its use, without any action being required by the user.

Figure 15:
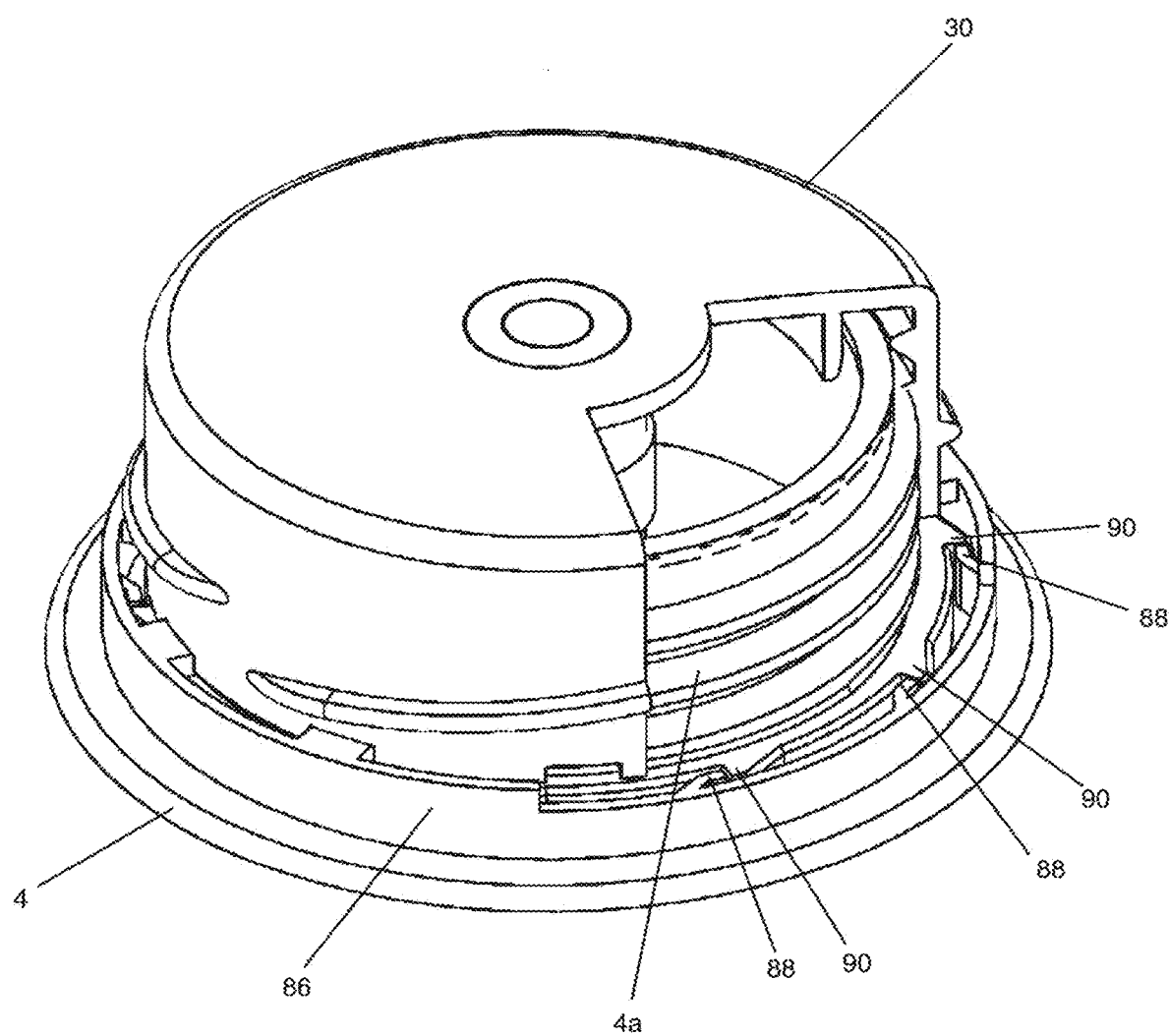
FIG. 15 is a perspective view of the inner portion of the cap according to one embodiment of the present invention, said inner portion comprising a closure system arranged to prevent the removal of the inner portion of the cap from the container.

FIG. 15 shows the inner portion 30 of the cap 10 according to one embodiment of the present invention. A section of the inner portion 30 is shown cutaway, exposing a section of a neck 4a of the container 4. In the illustrated embodiment, the inner portion 30 comprises a closure system for preventing removal of the inner portion 30 from the container 4. The inner portion 30 is arranged to screw onto the container neck 4a. The inner portion 30 comprises a locking ring 86 comprising a plurality of lugs 88 arranged to engage with corresponding lugs 90 provided on the container neck 4a. The respective lugs 88, 90 are configured to allow the inner portion 30 to be screwed onto the container neck in a first rotational direction, and to prevent the inner portion 30 from being unscrewed in a second, opposing rotational direction. Accordingly, once the inner portion 30 is screwed onto the container neck 4a, it cannot be subsequently removed by rotating in the opposite direction. A specific means is required to remove the inner portion 30 from the container neck 4a, such as a specific tool arranged to release the inner portion 30 from the container neck 4a, thus allowing the manufacturer or supplier to prevent a user of the container from removing the inner portion 30 from the container 4.

The invention has been described above with reference to specific embodiments, given by way of example only. It will be appreciated that many different arrangements of the system are possible, which fall within the scope of the appended claims.

The invention claimed is:

1. An apparatus for dispensing liquid from a container and for monitoring the level of liquid within said container, the apparatus comprising:

a container for storing liquid to be dispensed;
a conduit comprising:
  a feed tube arranged, in use, to extend from the container to an appliance; and
  a dip tube extending in the container to the bottom of the container;
  wherein the feed tube and the dip tube are in fluid communication so as to define a liquid supply channel having (i) an open first end defined by a lower end of the dip tube, which, in use, is arranged to be immersed in said liquid in said container, and (ii) a second end defined by an end of the feed tube distal to the dip tube, which second end is located, in use, outside of said container; and
  wherein the conduit further comprises a pressure measurement channel branching from the liquid supply channel,
the apparatus further comprising:
  a cap arranged to engage with a neck of the container, the cap comprising a first portion to which the dip tube is connected, which first portion is arranged to engage with the neck of the container such that the first portion to which the dip tube is connected can be pre-installed into the neck of the container, allowing the container to be supplied with the dip tube in place, the cap further comprising a second portion to which the feed tube is connected, which second portion is arranged to releasably engage with the first portion, so as to fluidly couple the dip tube to the feed tube to form the liquid supply channel of the conduit, permitting, in use, the container to be replaced by disconnecting the second portion from the first portion of the cap, and subsequently connecting the same second portion to a different first portion, pre-installed into the neck of a replacement container;
  a pressure transducer in fluid communication with the pressure measurement channel; and
  a means to draw liquid through the liquid supply channel from the first end of the liquid supply channel to the second end of the liquid supply channel so as to dispense liquid from said second end;
  wherein the pressure measurement channel branches from the liquid supply channel at a fixed height relative to the second portion of the cap, and thus at a fixed height relative to the bottom of the dip tube, when the second portion of the cap is engaged with the first portion of the cap.

2. The apparatus according to claim 1, wherein the pressure measurement channel is arranged to branch from the liquid supply channel at a substantially right angle relative to the feed tube.

3. The apparatus according to claim 1, wherein the pressure measurement channel comprises an accumulator, said accumulator being arranged to collect any liquid drawn from the container into the pressure measurement channel.

4. The apparatus according to claim 1, wherein the pressure measurement channel comprises a diaphragm separating the liquid supply channel from the pressure transducer.

5. The apparatus according to claim 1, wherein the pressure measurement channel branches from the feed tube.

6. The apparatus according to claim 1, wherein the apparatus further comprises a closure system arranged to prevent or restrict removal of the first portion of the cap from the container.

7. The apparatus according to claim 1, wherein a liquid valve is provided in the first portion of the cap in a liquid flow passage of the cap, the liquid valve being arranged to close the liquid flow passage when the first and second portions of the cap are disconnected so as to prevent the passage of liquid through the liquid flow passage, and wherein the second portion of the cap comprises a pin arranged to engage the liquid valve when the first and second portions of the cap are connected so as to open the liquid valve such that the liquid valve does not significantly resist the flow of fluid therethrough.

8. The apparatus according to claim 1, wherein a vent valve is provided in the first portion of the cap, the vent valve being arranged to be closed when the first portion and the second portion of the cap are disconnected so as to prevent the passage of air through the vent valve, and wherein the second portion comprises a member arranged to engage with the vent valve when the first and second portions of the cap are connected so as to open the vent valve, such that the passage of air through the vent valve is permitted.

9. The apparatus according to claim 1, wherein the pressure measurement channel branches from the liquid supply channel at a point adjacent to the second portion of the cap.

10. The apparatus according to claim 1, wherein the pressure measurement channel is in fluid communication with the liquid supply channel at a first end of the pressure measurement channel and is closed at a second end of the pressure measurement channel.

11. The apparatus according to claim 1, wherein the means to draw liquid through the liquid supply channel comprises a pump connected to the second end of the liquid supply channel.

12. The apparatus according to claim 11, further comprising one of the following features (i) to (iii):
  (i) the apparatus comprises a non-return valve provided between the second end of the liquid supply channel and the point at which the pressure measurement channel branches from the liquid supply channel;
  (ii) the pump comprises a non-return pump; or
  (iii) the apparatus comprises a valve arranged to be closed on cessation of operation of the pump, said valve being provided between the second end of the liquid supply channel and the point at which the pressure measurement channel branches from the liquid supply channel.

13. A system for dispensing liquid from a plurality of containers, the system comprising an apparatus according to claim 1 and one or more additional containers.

14. The system for dispensing liquid from a plurality of containers according to claim 13, wherein the fixed height of the pressure measurement channel is the same for multiple containers of the plurality of containers.

* * * * *